Figure 1:
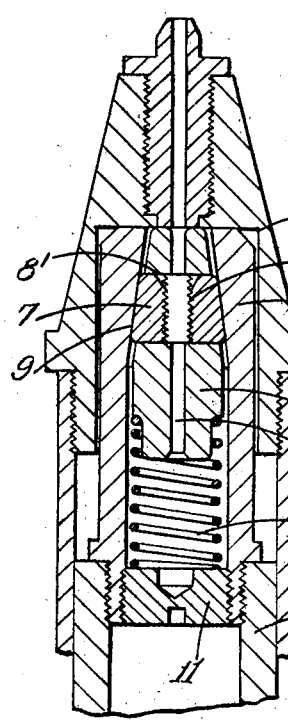

Dec. 7, 1943.                 E. M. BETTINGTON                  2,336,058
                       TOOL FOR UPSETTING TUBULAR RIVETS
                            Filed April 22, 1940

Inventor:-
Egerton M. Bettington,
By: Smith, Michael & Gardiner,
          Attorneys.

Patented Dec. 7, 1943

2,336,058

UNITED STATES PATENT OFFICE 2,336,058

TOOL FOR UPSETTING TUBULAR RIVETS

Egerton Mitford Bettington, Loughton, England, assignor to Aviation Developments Limited, Welwyn Garden City, England, a British company Application April 22, 1940, Serial No. 331,057
In Great Britain April 28, 1939

2 Claims. (Cl. 218—19)

This invention relates to tools for upsetting tubular rivets, and relates particularly to a tool for use in riveting operations wherein a mandrel inserted through a tubular rivet is adapted to be drawn completely through the rivet during the upsetting operation.

It is an object of my invention to provide an improved tool of this class which will insure a tight and positive gripping of the mandrel by the tool during the upsetting operation, and which will effectively avoid any tendency for slip to occur between the tool and the inserted mandrel.

It is an object of my invention to provide a tool for gripping and pulling a mandrel for upsetting tubular rivets, which tool includes a jaw or jaws adapted to positively grip the mandrel and in which novel means are provided for supporting and actuating the jaw or jaws to insure effective gripping action between the jaw or jaws and the mandrel engaged thereby.

It is a further object of my invention to provide a tool for gripping and pulling a mandrel through a hollow or tubular rivet, which tool includes an outer tubular casing, an internally tapered sleeve axially slidable within the casing and a novel form of carrier resiliently mounted within the tubular sleeve, which carrier supports the gripping jaw or jaws, and to so construct and arrange the several component parts of the tool that a positive and effective gripping action is insured between the gripping jaw or jaws and the inserted mandrel.

It is a still further object of my invention to provide a tool of the above referred to character in which the jaw or jaws are moved into positive gripping engagement with respect to the mandrel by relative sliding movement between an internally-tapered sleeve and a jaw carrier, the arrangement being such that as the sleeve moves initially relative to the carrier, the internally-tapered surface of the sleeve will engage the jaw or jaws and will force the same into positive gripping engagement with the inserted mandrel, the carrier being resiliently mounted within the sleeve so that as the sleeve is moved to the non-gripping position of the tool, the jaw or jaws are permitted to release the grip on the mandrel whereby the mandrel may be withdrawn from the tool.

Tools of the general class to which my present invention relates are old and well known in the art, being shown, for example, in the U. S. Patent to H. N. Wylie et al. 1,829,696 of October 27, 1931, and British Patent 514,462 of 1939, to Aviation Developments Limited. Such tools operate on the principle of radially enlarging a tubular rivet by drawing through the rivet a mandrel having an enlargement on its end, the diameter of which enlargement is greater than the internal diameter of the rivet. In the use of such tools a tubular rivet is first threaded onto the stem of the mandrel, after which the end of the stem opposite that on which the enlargement is formed is inserted between the jaws of a tool employed to grip the stem of the mandrel and to pull the mandrel through the rivet. Such tools generally include an outer casing, an inner sleeve slidable within the casing and a jaw or jaws actuated by the slidable sleeve, means being provided for forcing the end of the outer casing inwardly and into contact with the adjacent end of the rivet and for simultaneously pulling the inner sleeve outwardly to actuate a mandrel-gripping means and to pull the mandrel through the tubular rivet to effect the desired upsetting of the rivet. My present invention is directly concerned with a tool of this general type and, particularly with the provisions of a novel means for positively and effectively gripping the mandrel to avoid the possibility of slippage between the tool and the inserted mandrel.

Figure 2:
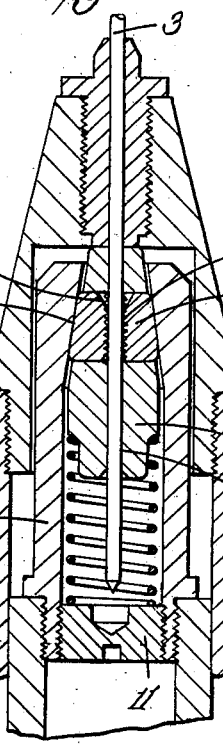
Figure 3:
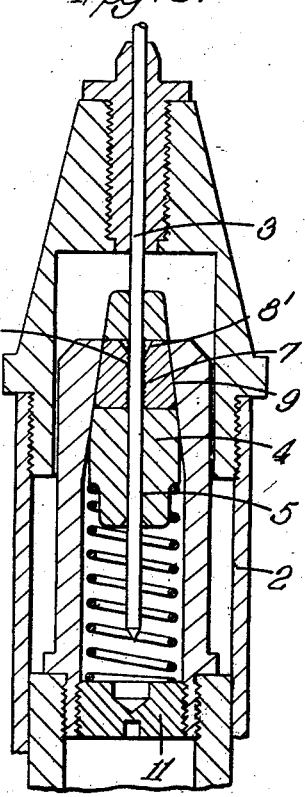
Figure 4:
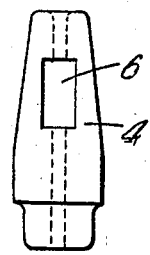
Figure 5:
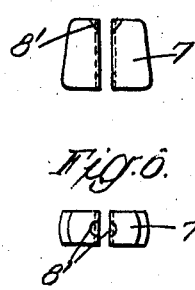
Figure 6:
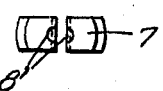
Figure 7:
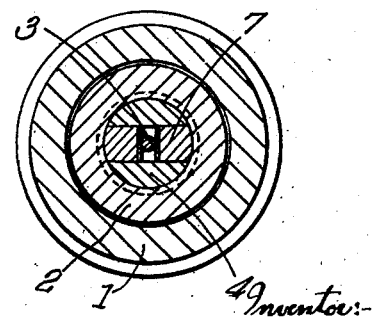

In the accompanying drawing wherein I have shown a preferred embodiment of my present invention, Figures 1, 2 and 3 illustrate in sectional elevation a portion of a tool constructed in accordance with my present invention, Figure 4 is a side elevation of a carrier member for the jaws of the tool illustrated in Figures 1 to 3, inclusive, Figures 5 and 6 are a side elevation and a plan view, respectively, of a pair of gripping jaws which may be employed in the tool illustrated in Figures 1 to 3 inclusive, and Figure 7 is a sectional view on the line X—X of Figure 2.

Referring to the drawing wherein like reference numerals have been employed to designate like parts throughout the several views, Figures 1, 2 and 3 show a portion of the gripping or forward end of a preferred form of my improved tool for gripping and pulling tubular rivets, said tool comprising an outer casing 1, provided with a cylindrical bore having a substantially closed upper end wall and having an opening extending through a wall thereof to permit insertion of the stem of a mandrel into the casing as is the usual construction of tools of this general character. Within the cylindrical bore of the casing 1 is a tubular sleeve 2 having an opening at its upper end alined with the opening in the casing 1, said sleeve being tapered internally at its upper end so that the end of the taper of lesser diameter is disposed in the direction of the upper end wall of the casing 1, this sleeve being axially slidable within the bore of the casing 1, and the upper end of said sleeve thus being movable to and from a position where it abuts said end wall.

Suitable means (not shown) are employed for effecting relative movement between the casing 1 and sleeve 2, i. e., for forcing the nose of the casing 1 into contact with an adjacent rivet and for simultaneously pulling the sleeve 2 in the opposite direction. Such means constitute no part of my present invention and may take various forms, for example, this relative movement between the casing and sleeve may be effected by the mechanism shown in the H. N. Wylie et al. Patent 1,829,696 of October 27, 1931, in the L. C. Huck et al. Patent 2,053,718 of September 8, 1936 and in many others disclosing operating means for riveting tools of this general character and which are adapted to grip and pull a mandrel such as the mandrel 3 shown in Figures 2 and 3 of the accompanying drawing.

The carrier 4 of my present invention is shown in detail in Figure 4 and in its assembled, operative position in Figures 1, 2 and 3 of the accompanying drawing. This carrier comprises a substantially cylindrical body portion, the outer surface of which is upwardly tapered to correspond to the internal taper within the upper end of the sleeve 2, it being particularly noted that the outer diameter of the upper end portion of the carrier 4 is less than the internal diameter of the adjacent inner open end of the internally-tapered sleeve 2 whereby the upper end of the carrier 4 may project outwardly beyond the upper end of the sleeve 2 as clearly shown in Figures 2 and 3. The carrier 4 is provided with an axial bore 5 which extends throughout the length of the carrier and which communicates with the aligned openings in casing 1 and in sleeve 2, and said carrier is provided with one or more slots 6 which extend from the axial bore 5 of the carrier to the outer surface thereof. Each of the slots 6 is adapted to receive therein a loose jaw 7 mounted within the slot for radial movement therein with respect to the axis of the carrier, each jaw having a straight inner face 8 disposed toward the axial bore 5 in the carrier 4 and substantially parallel therewith, which face is provided with a series of transverse serrations which terminate at the upper end of said face in a beveled portion 8' for a purpose which will be hereinafter described. The outer face 9 of each jaw is inclined to correspond to the inclination of the upper tapered portion of the sleeve 2.

The sleeve 2 is closed at one end by a screw plug 11, and a compression spring 12 which is arranged between said plug 11 and the base or bottom of the carrier 4 tends to constantly urge the carrier upwardly so that its upper end is maintained in normal contact with the upper end wall of the casing 1 as shown in Figures 1 and 2 when the sleeve 2 is in its uppermost position as shown in Figure 1 and during the initial movement of the sleeve 2 away from said end wall as shown in Figure 2. The lower or closed end of the sleeve 2 is threadedly engaged by means of a sleeve 21, which in known manner is moved relatively to the casing 1 to pull the said sleeve rearwardly of the casing during the operation of upsetting a rivet.

Referring now to the operation of my present invention, the detailed construction of which is described above, it is to be noted that the tubular rivet which is to be upset is placed on the stem of the mandrel 3 with the preformed head of the rivet remote from the enlargement on the mandrel. The stem of the mandrel is inserted into the axial bore 5 of the carrier 4 by passing said stem through the alined openings in the casing 1 and in sleeve 2 until the forward end or nose of said casing abuts the preformed head of the rivet. The component parts of the improved tool, at this stage of the upsetting operation, occupy the positions shown in Figure 1, i. e., the upper ends of the carrier 4 and of the sleeve 2 are in abutting relation with the end wall of the casing 1. In this position the jaw or jaws 7 are free to move outwardly toward the internally tapered surface of the sleeve 2, said jaw or jaws being freely movable to non-gripping position due to the initial contact between the end of the mandrel and the tapered or beveled surfaces 8' at the upper ends of the jaws 7. It will be obvious that when the parts occupy the positions shown in Figure 1, the jaw or jaws 7 are not forced inwardly by contact between the outer inclined surface or surfaces of said jaw or jaws and the internally-tapered surface of the sleeve 2. When the parts occupy the positions shown in Figure 1, i. e., with the ends of the carrier 4 and sleeve 2 in abutting relation with the end wall of the casing 1, the spring 12 is under its maximum degree of compression.

After the insertion of the stem of the mandrel into the tool of my present invention, the sleeve 2 is moved rearwardly with respect to the casing 1, suitable mechanism of any desired or preferred construction and well known in the art relating to tools of this general type being employed for this purpose. During the initial movement of the sleeve 2 relative to the casing 1, the spring 12 expands to maintain the upper end of the carrier in contact with the end wall of the casing, this condition being shown in Figure 2. Continued movement of the sleeve 2 will cause the engagement of the internally-tapered surface of the sleeve 2 with the correspondingly tapered surface of the jaw or jaws 7, which will force said jaw or jaws radially inward and cause the same to positively grip the stem of the inserted mandrel. The position of parts during this phase of the operation is shown in Figure 2. Continued movement of the sleeve 2, say from the position shown in Figure 2 to the position shown in Figure 3 causes the sleeve to move the carrier 4, the jaw or jaws 7 and the mandrel 3 rearwardly with respect to the casing 1. During this continued movement the mandrel 3 is positively gripped by the jaw or jaws 7 and said mandrel is pulled through the tubular rivet so that the enlargement on the end of the mandrel will effect the desired upsetting of the rivet.

Upon the completion of the upsetting operation, the sleeve 2 is moved in the opposite direction relative to casing 1, i. e., the sleeve 2, the carrier 4 and the jaw or jaws 7 are moved toward the apertured end wall of the casing 1. As this movement continues, the upper end of the carrier will abut said end wall as shown in Figure 2, and as before stated, the carrier will be maintained in this position by means of the spring 12 during this phase of the mandrel releasing operation. Continued movement of the sleeve 2 from the position shown in Figure 2 to the position shown in Figure 1, will cause the upper end of the sleeve 2 to abut the end wall of the casing 1, it being noted that during this phase of the operation the sleeve moves upwardly with respect to the carrier 4 thus relieving the pressure between the tapered inner surface of the sleeve 5 and the tapered surface 9 of the jaw or jaws 7. Hence, said jaw or jaws no longer exert a gripping action on the stem of the mandrel and since the jaw or jaws 7 are now freely movable within the slot or slots 6, the mandrel 3 may be readily withdrawn from the tool through the alined openings in sleeve 2 and casing 1. The parts of the tool then assume the positions shown in Figure 1 and the tool is ready to receive a mandrel for a subsequent rivet upsetting operation.

It is to be understood that the form of my invention herein shown and described is to be taken as a preferred embodiment of the same and that various changes may be made in the size, shape and arrangement of parts without departing from the spirit of the invention or from the scope of the subjoined claims.

Having thus described my invention, I claim:

1. In a tool for gripping and pulling a mandrel for upsetting tubular rivets, a tubular casing having a substantially closed upper end wall and having an opening extending through a wall thereof to permit insertion of a mandrel into said casing; an internally tapered sleeve axially slidable within said casing to and from a position where its upper end abuts said end wall, said sleeve having a closed lower end and having an opening at its upper end alined with the opening; a carrier slidably mounted within said sleeve and having an axial bore therethrough in said casing which communicates with the alined openings in said casing and in said sleeve, the outer diameter of the upper end of said carrier being less than the internal diameter of the upper end of the sleeve whereby the upper end of said carrier may project upwardly beyond the upper end of said sleeve, said carrier having at least one radial slot intermediate its ends and extending from the axial bore of the carrier to the outer surface thereof; a jaw mounted in the slot for radial movement therein and having its outer surface slidably engaging the tapered inner wall of said sleeve and its inner surface adapted to grip a mandrel inserted into the bore in the carrier; a compression spring mounted within the sleeve between the lower closed end thereof and the lower end of said carrier and adapted to maintain the upper end of the carrier in normal contact with said end wall when the sleeve is in its uppermost position and during the initial movement of said sleeve away from said end wall; and means for moving said sleeve and carrier axially within said casing, movement of the upper end of said sleeve away from said end wall causing said jaw to grip the inserted mandrel and to pull the same into the casing, and movement of the upper end of said sleeve and carrier into contact with said end wall causing the carrier to move axially with respect to said sleeve and against said spring thus relieving the pressure between the outer surface of the jaw and the tapered inner surface of the sleeve to release the grip of th jaw on the mandrel.

2. In a tool for gripping and pulling a mandrel for upsetting tubular rivets, a tubular casing having a substantially closed upper end wall and having an opening extending through a wall thereof to permit insertion of a mandrel into said casing; an internally tapered sleeve axially slidable within said casing to and from a position where its upper end abuts said end wall, said sleeve having a closed lower end and having an opening at its upper end alined with the opening; in said casing an axially-tapered carrier slidably mounted within said sleeve and having an axial bore therethrough which communicates with the alined openings in said casing and in said sleeve, the outer diameter of the upper end of said carrier being less than the internal diameter of the upper end of the sleeve whereby the upper end of said carrier may project upwardly beyond the upper end of said sleeve, said carrier having a plurality of radial slots intermediate its ends, each extending from the axial bore of the carrier to the outer surface thereof; a jaw mounted in each of said slots for radial movement therein and having its outer surface slidably engaging the tapered inner wall of said sleeve and its inner surface adapted to grip a mandrel inserted into the bore in the carrier; a compression spring mounted within the sleeve between the lower closed end thereof and the lower end of said carrier and adapted to maintain the upper end of the carrier in normal contact with said end wall when the sleeve is in its uppermost position and during the initial movement of said sleeve away from said end wall; and means for moving said sleeve and carrier axially within said casing, movement of the upper end of said sleeve away from said end wall causing said jaws to grip the inserted mandrel and to pull the same into the casing, and movement of the upper end of said sleeve and carrier into contact with said end wall causing the carrier to move axially with respect to said sleeve and against said spring thus relieving the pressure between the outer tapered surfaces of the jaws and the tapered inner surface of the sleeve to release the grip of the jaws on the mandrel.

EGERTON MITFORD BETTINGTON.